Figure 1A:
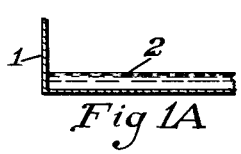

Dec. 8, 1936.   G. M. KUETTEL   2,063,315
PREPARATION OF CAST RESINS
Filed July 24, 1934

INVENTOR.
Glen M. Kuettel
BY
J. M. Castle Jr.
ATTORNEY.

Patented Dec. 8, 1936

2,063,315

UNITED STATES PATENT OFFICE 2,063,315

PREPARATION OF CAST RESINS

Glen M. Kuettel, Roselle, N. J., assignor, by mesne assignments, to E. I. du Pont de Nemours & Company, Wilmington, Del., a corporation of Delaware Application July 24, 1934, Serial No. 736,678

9 Claims. (Cl. 18—58)

This invention relates to the preparation of cast resins and, more particularly, to the preparation of cast resins in relatively thick solid shapes from polymerizable, unsaturated, organic compounds.

There is a substantial class of unsaturated organic liquids capable of being polymerized by suitable agencies to form solid resins of more or less rigid character which, in the form of blocks, rods, tubes, and other primary shapes, are capable of being fabricated, e. g. by suitable machining processes, into useful articles of commerce. For the preparation of these so-called turnery resins it is desirable to effect the polymerization of the initial materials in forms or molds, so as to secure by means of a single operation either the primary shapes which in turn constitute the raw material for the fabrication of the ultimate article, or, in some cases, the shape of the ultimate article itself or a close approximation thereto, which can be finished by a minimum of machining operations, polishing, and the like.

Unfortunately, however, serious obstacles to the successful formation of resin shapes in this manner are offered by the considerable contraction in volume which takes place in these substances during, and as a result of, their polymerization, and the exothermic nature of the polymerization reaction.

As a result of these factors, the polymerization of these liquids in solid shape molds of commercial dimensions and at commercially economical speeds has been attended by the development of flaws of two types. The contraction in volume has resulted in local shrinkages, ordinarily at the interface between the resin and the mold. Development of heat by the exothermic reaction has resulted in local overheating, usually in the central portions of the mass, which has caused volatilization of the material and, consequently, bubbles are produced in the resin. These defects, not always distinguishable from each other, have resulted, at best, in a loss of yield of material through the necessity of machining off a layer from the outside to the depth of the superficial flaws or discarding portions containing internal flaws, and, at worst, in the necessity of scrapping entire batches of the product, since the purposes for which such turnery resin shapes command a market require that the material, which is frequently or even usually made up in transparent or translucent form, be entirely free from flaws.

The serious difficulties described above in the production of turnery resins from these organic compounds have been recognized to some extent in Ostromislensky U. S. Patent 1,683,402, wherein it is suggested that some relief can be found in polymerizing long slender rods by supporting the mold in horizontal position rather than in vertical position. However, this suggestion obviously is only applicable to shapes approximating slender rods and, even as applied to rod shapes, has proven inadequate where a rod of substantial thickness is desired. Therefore, it has remained as a general rule in the production of these turnery resins heretofore that, in order to secure turnery resins of solid shapes of commercial dimensions, it is necessary to limit the rate of polymerization so drastically that the cycle of operations is too slow to make the process commercially practical. Furthermore, even under the most favorable conditions in this respect, the shapes so formed have not been entirely free from localized superficial shrinkage flaws.

An object of the present invention is to provide an improved simple and economical process of preparing these turnery resins. A further object is to provide a process of preparing cast resins in relatively thick solid shapes from a polymerizable, unsaturated, organic compound having an exothermic polymerization reaction and tending to contract in volume during polymerization. A still further object of the invention is to provide a process wherein the objections to the prior art practice, as discussed above, are overcome. A particular object of the invention is to provide a process whereby these turnery resins can be made at commercially practical speeds free from flaws under conditions which result in low cost of operation and high yields. Other objects of the invention will be apparent from the description given hereinafter.

The above objects are accomplished according to the present invention by disposing a polymerizable, unsaturated, organic compound having an exothermic polymerization reaction and tending to contract in volume during polymerization, while said compound is in the state of a flowable liquid, in a relatively thin layer in a mold, polymerizing said layer to form a solid body, superposing thereon a second relatively thin layer of the liquid polymerizable compound, and polymerizing said second layer to form with the first layer a substantially homogeneous solid body. More specifically the invention is carried out by disposing the polymerizable compound while in the state of a flowable liquid, either as the monomer or in a partially polymerized form, in a relatively thin layer in a mold and then polymerizing the layer by any suitable means to form a solid body, said polymerization being carried out to substantial completeness, and thereupon superposing a second relatively thin layer of the liquid polymerizable compound on the first layer and polymerizing this second layer. A third layer and other layers are likewise superposed and polymerized in turn until a substantially homogeneous solid body is built up to the desired thickness.

In order to more clearly understand the invention, it will be described as applied to methyl alpha methacrylate which represents a type of polymerizable, unsaturated, organic liquid offering the difficulties above discussed. Monomeric methyl alpha methacrylate is a colorless, mobile liquid of rather ready volatility and having a boiling point of approximately 100° C. at atmospheric pressure. It is capable of being polymerized by various agencies such as heat, actinic light, and certain catalysts, as are all of the compounds herein under consideration. The polymer formed under favorable conditions is a hard, rigid, tough resin completely colorless, transparent, and highly brilliant and is, by virtue of these properties, an unusually attractive resin for turnery purposes.

The specific gravity of the monomeric methyl alpha methacrylate is 0.936 at 26° C., whereas the specific gravity of polymerized methyl alpha methacrylate is in the neighborhood of 1.186 at the same temperature, the exact value depending upon the degree of completeness of the polymerization. Accordingly, there takes place during the polymerization of methyl alpha methacrylate a contraction, or shrinkage, amounting to approximately 21.3% of the initial volume. Likewise, it can be readily shown by experiment that the polymerization reaction of methyl alpha methacrylate is distinctly exothermic. The compound thus typically meets the qualifications of the compounds to which the present invention is applicable, that is, polymerizable, unsaturated, organic compounds having an exothermic polymerization reaction and tending to contract in volume during polymerization.

Figure 2:
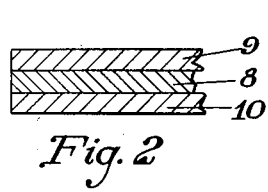
Figure 3A:
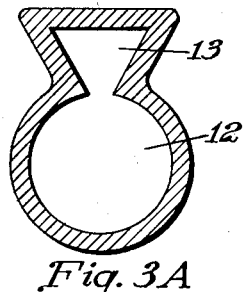
Figure 3B:
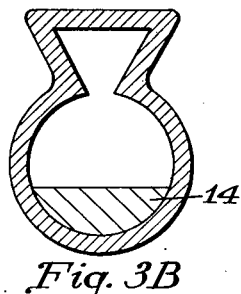
Figure 3C:
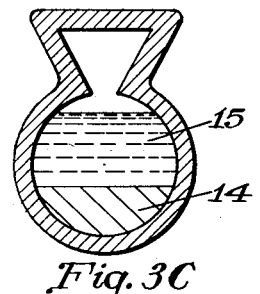
Figure 3D:
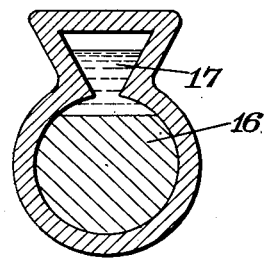
Figure 3E:
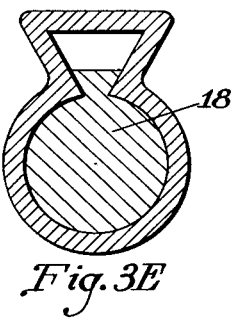
Figure 3F:
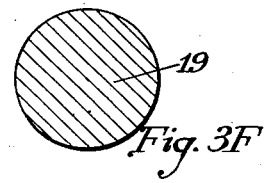
Figure 4A:
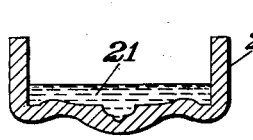
Figure 4B:
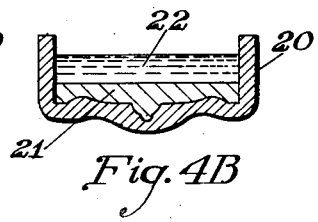
Figure 4C:

In the specific examples given hereinafter, reference will be made to the drawing accompanying the present application wherein;

Figs. 1A to 1E, inclusive, represent, more or less diagrammatically, vertical sections through a container at various stages of the process according to the present invention;

Fig. 2 is a vertical section through a block of material showing a product made by a specific embodiment of the present invention;

Figs. 3A and 3E, inclusive, represent vertical sections through a different type of mold at various stages during the process of the present invention, Fig. 3F being a vertical section of the molded article obtained;

Figs. 4A and 4B are vertical sections through a third type of mold at two stages of the process according to the present invention and Fig. 4C is a vertical section through the molded article obtained.

Figure 1B:
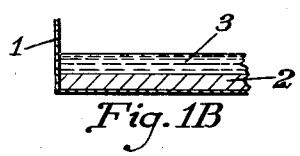
Figure 1C:
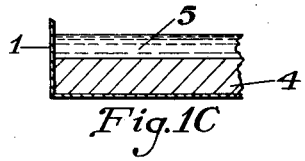
Figure 1D:
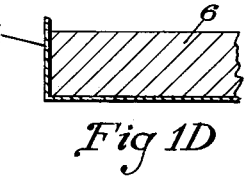
Figure 1E:
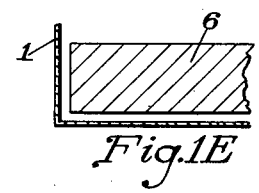

*Example 1.*—Referring to Figs. 1A to 1E of the drawing, into a suitably cleaned and dried metal tray 1 is poured liquid methyl alpha methacrylate monomer to a depth of 0.5", forming a layer 2. The tray is provided with a suitable gasketed cover (not shown) for the prevention of loss of material by evaporation and is placed in an oven held at 70° C., plus or minus 2° C. At the end of 24 hours the layer 2 is substantially completely polymerized to a solid. There is now poured upon the solid polymerized layer 2 a second layer 3 of the monomeric liquid, also to a depth of 0.5", (Fig. 1B). This layer in turn is polymerized in the same manner to give, with the layer 2, an integral solid layer 4 on which is then poured a third layer 5 of the monomeric liquid, also to a depth of 0.5", (Fig. 1C). This last layer is likewise polymerized to give an integral block or sheet 6 (Fig. 1D) of a thickness of 1.18", assuming no loss by evaporation, in which the junction planes between the layers are barely, if at all, visible. This block 6 may be removed from the tray 1 (Fig. 1E) and used as a turnery resin. It is crystal clear and free of flaws.

*Example 2.*—A block of polymerized methyl alpha methacrylate is prepared as in Example 1 except that the intermediate layer is colored by the addition of 0.02% by weight of the monomer in that layer of a dye. The resulting block, (Fig. 2), although structurally integral, is made of a central colored zone 8 with colorless zones 9 and 10 above and below.

*Example 3.*—In this example a lead mold is used as illustrated in Figs. 3A to 3E. This mold has a circular mold cavity 12 (Fig. 3A) of 1.125" diameter and 19.5" in length and a triangular shaped reservoir cavity 13. The cross section of the reservoir cavity 13 is an equilateral triangle 0.75" on a side with its lower apex penetrating the circular cross section of the mold cavity 12 to such a depth that the width of the junction between the two is 0.188". The mold is placed in horizontal position with the reservoir cavity 13 above the mold cavity 12 as shown in Fig. 3A. Through a hole (not illustrated) in the upper wall of the reservoir 13, 175 cc. of liquid methyl alpha methacrylate is introduced. The hole in the mold is then plugged and the mold placed in horizontal position in an oven held at 70° C. for 24 hours. At the end of this period the monomer will have polymerized to a hard resin layer 14 (Fig. 3B) having a thickness of 0.5". 150 cc. more of the monomer is then introduced into the mold to give the liquid layer 15 on top of the solid layer 14. This monomer is polymerized as the previous layer to give, with layer 14, an integral block or layer 16 (Fig. 3D) having a thickness of 0.875". A third volume of liquid monomer is then poured into the mold, approximating 85 cc., giving a liquid layer 17. This completes the filling of the mold cavity 12 and provides an excess in the reservoir cavity 13 (Fig. 3D). Polymerization is carried out as before, thus obtaining an integral resin rod 18 (Fig. 3E) having the full cross section of the mold cavity 12 and a slight excess in order to insure the full circular cross section desired at all points throughout the length of the rod. The total thickness of the rod is 1.25", i. e., the diameter of the rod 1.125" and an excess section of 0.125" high. When removed from the mold the rod 18 is turned or ground to circular cross section by removal of the small excess section, giving a perfect finished rod 19 as shown in Fig. 3F. The rod is free of flaws and may be used as a turnery resin shape.

*Example 4.*—This is carried out as in Example 1 except that the methyl alpha methacrylate poured to form the successive layers is not in monomeric mobile form but is in a partially polymerized syrupy form obtained by heating the monomer for 3 hours at 70° C. The completion of the polymerization in the tray requires, at 70° C., 21 hours for each layer.

*Example 5.*—Fig. 4A illustrates diagrammatically in cross section a lead mold for the preparation of a block of resin in the form of an ornamental medallion. The diameter of the mold cavity is 5" and it is desired to form a medallion having an extreme thickness of 0.75". Into the mold is poured sufficient liquid methyl alpha methacrylate monomer to form a layer 21 having a thickness of 0.5". Using suitable means to prevent evaporation of the liquid, the mold is subjected to a temperature of 70° C. for 24 hours, thereby polymerizing the layer 21 to a hard resin. Over this layer 21 is then poured a second layer 22 (Fig. 4B) of the liquid monomer to an additional depth of 0.5". Polymerization of this second layer is carried out in the same manner that the first layer was polymerized. There results an integral block of resin 23 (Fig. 4C) of the desired thickness (or slightly in excess) and free from flaws. The surface of the block 23 in contact with the bottom surface of the mold reproduces perfectly the ornamental configuration thereof and requires no finishing.

It will be understood that the above examples are merely illustrative and that the invention is broadly applicable to polymerizable, unsaturated organic compounds having an exothermic polymerization reaction and/or tending to contract during polymerization. Such compounds include acrylic and methacrylic acids, their homologues, and derivatives, particularly the esters of acrylic and methacrylic acids such as methyl alpha methacrylate, ethyl alpha methacrylate, butyl alpha methacrylate, phenyl alpha methacrylate, and glycol di-alpha methacrylate. Other compounds coming within this class include:

Vinyl acetate
Vinyl chloroacetate
Vinyl chloride
Styrene
Alpha-methyl styrene
Methyl vinyl ketone
Divinyl acetylene
Ethylene oxide
Acrolein
Dimethyl itaconate The invention is applicable to mixtures of these compounds and compositions containing these compounds, together with coloring matter, soluble or insoluble, and various auxiliary agents as plasticizers, modifiers, "effect materials", other resins, and the like, such as will occur to those skilled in the art.

The process is not limited to any particular means of polymerization. Heat may be employed alone, as illustrated in the examples, or light, catalysts, or any combination thereof.

The invention is independent of such details as the shape, size, or material of the mold or container in which the polymerization is carried out. For each substance which may be polymerized according to this invention and for each set of conditions of polymerization, i. e., temperature, percentage of catalyst, shape and volume of the mold, et cetera, there is a limiting vertical thickness of layer below which polymerization may be carried out at feasible speeds to the ultimate stage without the development of flaws. However, any desired vertical thickness can be built up by pouring out and polymerizing a sufficient number of successive layers, each within the safe limit of thickness. Obviously the determination of this limit of thickness for a specific set of conditions will necessitate a certain amount of testing and the specific examples merely illustrate the suitable thickness for layers under the particular conditions given therein.

The present invention is applicable to the production of rods, tubes, and various finished and semi-finished massive shapes for the production of articles such as are now made from resins of various types.

An advantage of the present invention is that it provides a simple and economical method of polymerizing compounds of the class described to give massive shapes free of internal bubbles and other visual defects. Further, the process may be carried out at commercially feasible speeds and requires a minimum amount of supervision by operators. The masses produced are integral and equal in appearance and strength to similar masses made in one polymerization, for example, by polymerizing at low temperatures for extended periods. The plane of junction between two layers of polymerized material is invisible for practical purposes, except where different colored layers are used to give pleasing effects. A further advantage of the process is that masses polymerized take the shape of the mold or container perfectly and the free top surface of the mass (provided it is protected from refluxed drops of liquid which might fall from the top of a closed container), is smooth and planar. This is a particular advantage where it is desired to form a resin block having an irregular surface, e. g., one with designs in relief or in intaglio. It is obviously desirable to be able to form such bodies by the general technique of casting but with resins of the type herein described this has not heretofore been practical, except in thin sections, since the configuration of the design in the finished resin has been marred by shrinkage flaws. The present process, by virtue of its elimination of shrinkage flaws, makes it feasible to form such bodies perfectly by polymerization in molds of the type described.

As many apparently widely different embodiments of this invention may be made without departing from the spirit and scope thereof, it is to be understood that the invention is not limited to the specific embodiments thereof except as defined in the appended claims.

I claim:

1. Process of preparing cast resins in relatively thick massive solid shapes from an addition polymerizable, unsaturated organic compound having an exothermic addition polymerization reaction and tending to contract in volume during polymerization, which comprises disposing the polymerizable compound while in a flowable state, in a relatively thin layer in a mold, polymerizing said layer to form a solid body, superposing thereon a second relatively thin layer of the liquid polymerizable compound, and polymerizing said second layer to form with the first layer an integral solid body.

2. Process of preparing cast resins in relatively thick massive solid shapes from an addition polymerizable, unsaturated organic compound having an exothermic addition polymerization reaction and tending to contract in volume during polymerization, which comprises disposing the polymerizable compound while in a flowable state, in a relatively thin layer in a mold, substantially completely polymerizing said layer to form a solid body, superposing thereon a second relatively thin layer of the liquid polymerizable compound, and substantially completely polymerizing said second layer to form with the first layer an integral solid body.

3. Process of preparing cast resins in relatively thick massive solid shapes from an addition polymerizable, unsaturated organic compound having an exothermic addition polymerization reaction and tending to contract in volume during polymerization, which comprises disposing the polymerizable compound while in a flowable state, in a relatively thin layer in a mold, polymerizing said layer to form a solid body, superposing thereon a second relatively thin layer of the liquid polymerizable compound, said second layer to form with the first layer an integral solid body, and repeating said last two steps until an integral solid body is built up layer by layer to the desired thickness.

4. Process of preparing cast resins in relatively thick massive solid shapes from methyl alpha methacrylate, which comprises disposing the methyl alpha methacrylate while in a flowable state, in a relatively thin layer in a mold, polymerizing said layer to form a solid body, superposing thereon a second relatively thin layer of the liquid methyl alpha methacrylate, and polymerizing said second layer to form with the first layer an integral solid body.

5. Process of preparing cast resins in relatively thick massive solid shapes from methyl alpha methacrylate, which comprises disposing the methyl alpha methacrylate while in a flowable state, in a relatively thin layer in a mold, polymerizing said layer to form a solid body, superposing thereon a second relatively thin layer of the liquid methyl alpha methacrylate, polymerizing said second layer to form with the first layer a substantially homogeneous solid body, and repeating said last two steps until an integral solid body is built up layer by layer to the desired thickness.

6. Process of preparing cast resins in relatively thick massive solid shapes from methyl alpha methacrylate, which comprises disposing the methyl alpha methacrylate while in a flowable state, in a layer not exceeding ½" in depth in a mold, polymerizing said layer to form a solid body of substantially completely polymerized methyl alpha methacrylate, superposing thereon a second layer of flowable methyl alpha methacrylate not exceeding ½" in depth, and polymerizing said second layer to form with the first layer an integral solid body.

7. Process of preparing cast resins in relatively thick massive solid shapes from methyl alpha methacrylate, which comprises disposing monomeric methyl alpha methacrylate in a layer not exceeding ½" in depth in a mold, polymerizing said layer at a temperature of about 70° C. to form a solid body of substantially completely polymerized methyl alpha methacrylate, superposing thereon a second layer of monomeric methyl alpha methacrylate, not exceeding ½" in depth, and polymerizing said second layer at a temperature of about 70° C. to form with the first layer an integral solid body.

8. Process of preparing cast resins in relatively thick massive solid shapes from an addition polymerizable, unsaturated organic compound having an exothermic addition polymerization reaction and tending to contract in volume during polymerization, which comprises disposing the polymerizable compound while in a flowable state, in a layer approximately ½" in depth in a mold, polymerizing said layer to form a solid body, superposing thereon a second layer of the liquid polymerizable compound approximately ½" in depth, and polymerizing said second layer to form with the first layer an integral solid body.

9. Process of preparing cast resins in relatively thick massive solid shapes from methyl alpha methacrylate, which comprises disposing the methyl alpha methacrylate while in a flowable state, in a layer approximately ½" in depth in a mold, polymerizing said layer to form a solid body of substantially completely polymerized methyl alpha methacrylate, superposing thereon a second layer of flowable methyl alpha methacrylate approximately ½" in depth, and polymerizing said second layer to form with the first layer an integral solid body.

GLEN M. KUETTEL.